(12) United States Patent
Schlachter

(10) Patent No.: US 10,589,604 B2
(45) Date of Patent: Mar. 17, 2020

(54) ADD-ON PART OF A VEHICLE BODY

(71) Applicant: Dr. Ing. h.c. F. Porsche Aktiengesellschaft, Stuttgart (DE)

(72) Inventor: Reimund Schlachter, Muehlacker (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 28 days.

(21) Appl. No.: 15/885,868

(22) Filed: Feb. 1, 2018

(65) Prior Publication Data

US 2018/0222295 A1    Aug. 9, 2018

(30) Foreign Application Priority Data

Feb. 3, 2017    (DE) .......................... 10 2017 102 177

(51) Int. Cl.
*B60J 5/04* (2006.01)
*B60J 5/10* (2006.01)
*B60R 13/08* (2006.01)

(52) U.S. Cl.
CPC .......... *B60J 5/0451* (2013.01); *B60J 5/0437* (2013.01); *B60J 5/0441* (2013.01); *B60J 5/0448* (2013.01); *B60J 5/0468* (2013.01); *B60J 5/0484* (2013.01); *B60J 5/107* (2013.01); *B60R 13/0815* (2013.01); *B60Y 2306/09* (2013.01)

(58) Field of Classification Search
CPC ...... B60J 5/0451; B60J 5/0437; B60J 5/0441; B60J 5/0484; B60J 5/107; B60J 5/0468; B60R 13/0815; B60Y 2306/09
USPC ....................................................... 296/146.6
See application file for complete search history.

(56) References Cited

U.S. PATENT DOCUMENTS

| | | | | |
|---|---|---|---|---|
| 3,184,263 A | * | 5/1965 | Plegat | B21D 13/02 49/501 |
| 5,094,318 A | * | 3/1992 | Maeda | B32B 7/02 181/290 |
| 5,795,013 A | * | 8/1998 | Keller | B60R 13/02 280/751 |
| 5,908,216 A | | 6/1999 | Townsend | |
| 6,196,619 B1 | * | 3/2001 | Townsend | B60J 5/0444 296/146.6 |

(Continued)

FOREIGN PATENT DOCUMENTS

| | | |
|---|---|---|
| DE | 40 08 111 | 9/1991 |
| DE | 698 05 960 | 10/2002 |

(Continued)

OTHER PUBLICATIONS

German Search Report dated Oct. 20, 2017.
Korean Examination Report dated Mar. 29, 2019.

*Primary Examiner* — Pinel E Romain
(74) *Attorney, Agent, or Firm* — Gerald E. Hespos; Michael T. Hespos; Matthew T. Hespos

(57) ABSTRACT

An add-on part (1) of a vehicle body, such as a door (1) or tailgate, has interconnected inner and outer parts (2, 4) and reinforced portions (5, 6) and a reinforcing device (7) connecting said reinforced portions (5, 6). The reinforcing device (7) has arms (8, 9, 18, 19), and, in the region of the ends of the arms (8, 9, 18, 19), the reinforcing device (7) is connected in a force-fitting and/or form-fitting manner to the reinforced portions (5, 6). Such an add-on part, while having a structurally simple design and relatively low weight, ensures particularly good stiffening properties.

15 Claims, 6 Drawing Sheets

(56) References Cited

U.S. PATENT DOCUMENTS

| | | | |
|---|---|---|---|
| 6,205,714 B1 * | 3/2001 | Staser | B60J 5/0416 |
| | | | 296/146.6 |
| 6,302,474 B1 * | 10/2001 | Drysdale | B60J 5/0441 |
| | | | 296/146.6 |
| 6,502,821 B2 | 1/2003 | Schneider | |
| 8,091,286 B2 * | 1/2012 | Totani | B60J 5/0401 |
| | | | 296/146.5 |
| 9,010,840 B2 * | 4/2015 | Brymerski | B60J 5/0415 |
| | | | 296/146.6 |
| 9,956,855 B2 * | 5/2018 | Tamaoki | B60J 5/0416 |
| 2002/0171260 A1 | 11/2002 | Schneider | |
| 2005/0046228 A1 | 3/2005 | Armbruster et al. | |
| 2010/0052360 A1 * | 3/2010 | Hsu | B60J 5/0437 |
| | | | 296/146.6 |
| 2014/0210233 A1 * | 7/2014 | Brymerski | B60J 5/0415 |
| | | | 296/191 |

FOREIGN PATENT DOCUMENTS

| | | |
|---|---|---|
| DE | 103 39 306 | 4/2005 |
| GB | 2 101 535 | 1/1983 |
| JP | 4-300715 | 10/1992 |
| JP | 2001-310632 | 11/2001 |
| JP | 2008-201246 | 9/2008 |

* cited by examiner

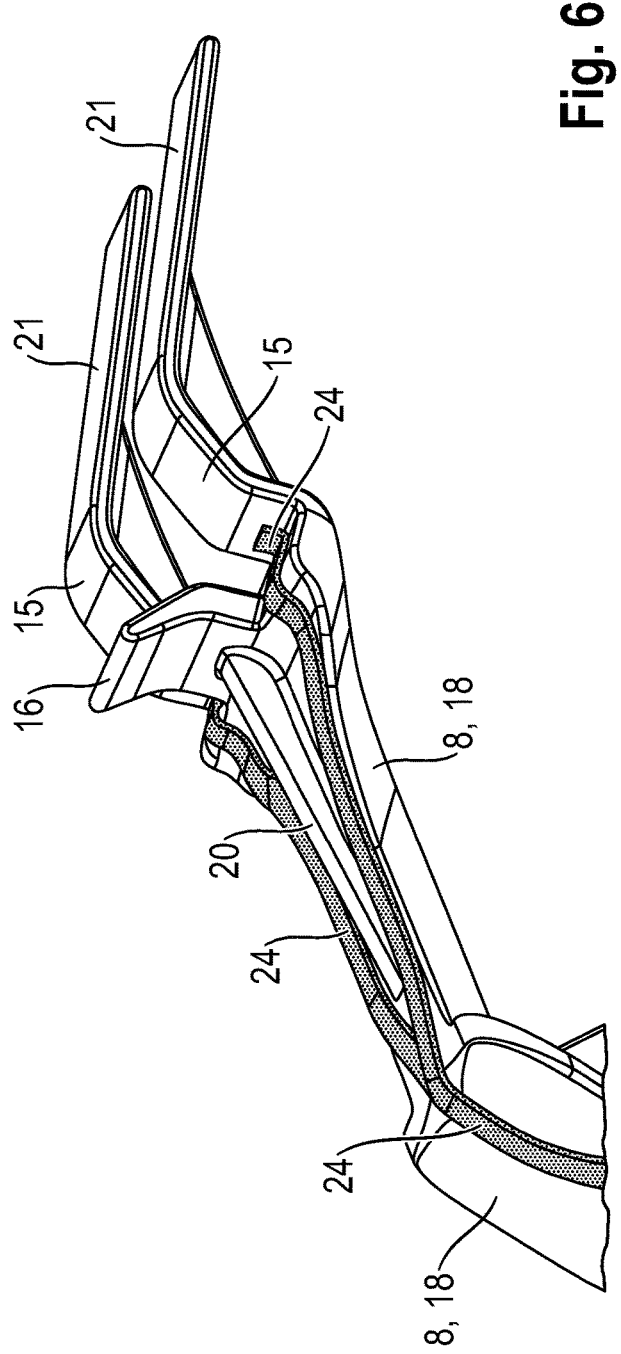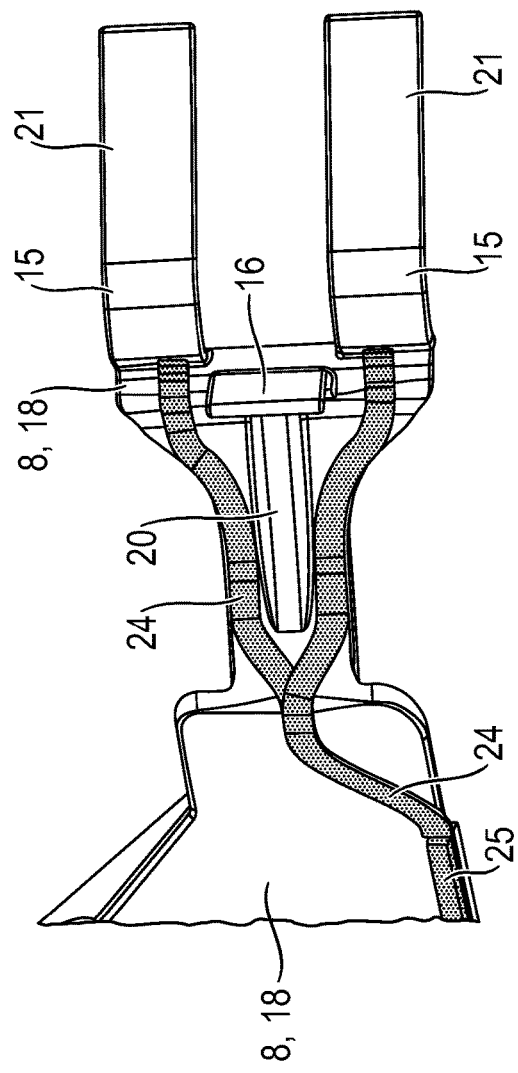
Fig. 6
Fig. 5

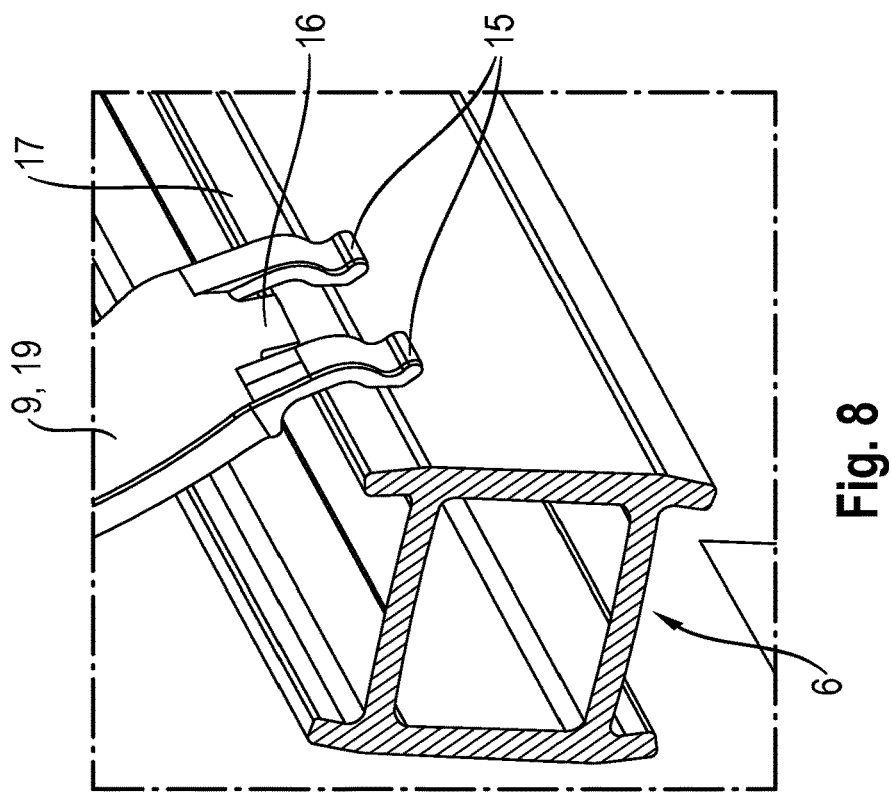
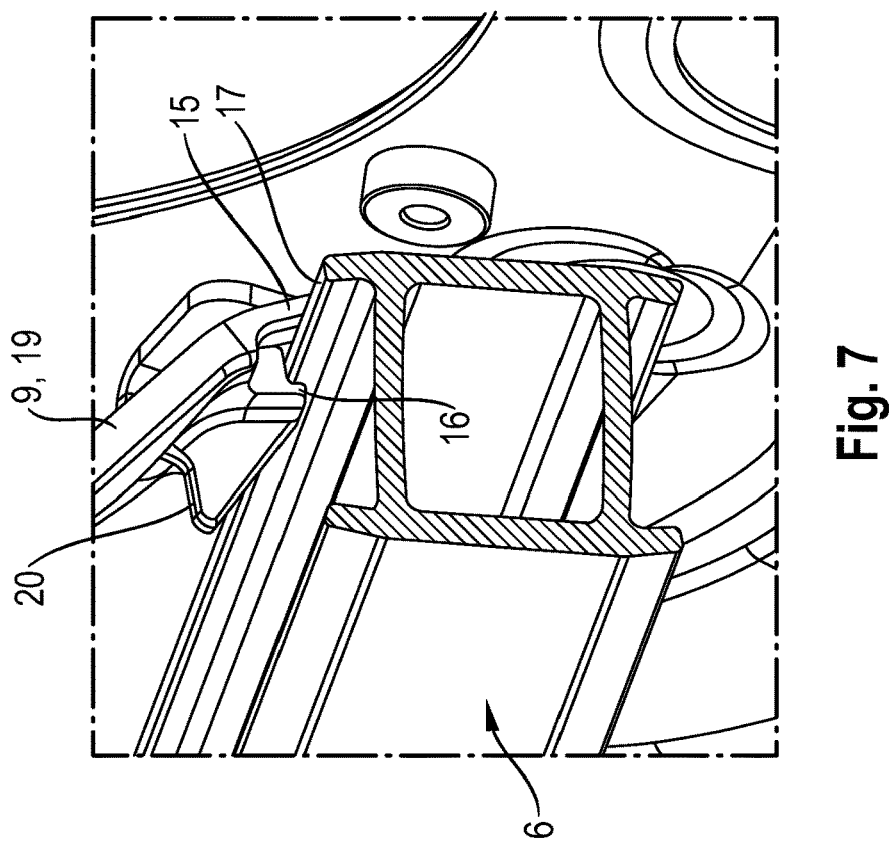

ADD-ON PART OF A VEHICLE BODY

CROSS REFERENCE TO RELATED APPLICATION

This application claims priority under 35 USC 119 to German Patent Appl. No. 10 2017 102 177.9 filed on Feb. 3, 2017, the entire disclosure of which is incorporated herein by reference.

BACKGROUND

Field of the Invention

The invention relates to an add-on part of a vehicle body, such as a door or tailgate. The add-on part has interconnected inner and outer parts, reinforced portions and a reinforcing device connecting the reinforced portions.

Description of the Related Art

A reinforcement or stiffening is of particular importance, particularly in the case of doors of vehicle bodies to ensure increased impact protection for the vehicle occupants.

It is also of particular importance in the case of add-on parts of vehicle bodies to minimize noise emissions due to vibrations of the add-on parts or within the add-on parts. For this purpose, use is made of insulating devices that are integrated in the add-on parts.

DE 103 39 306 A1 describes an add-on part in the form of a passenger vehicle door that is optimized from the aspect of impact protection. The vehicle door has a door outer part that is connected to an inner part and interacts on an inner side between frame parts of the door body with an impact device by means of a support device. In detail, two brackets designed as stiff components have the reinforced portions, and a reinforcing device designed as a holding plate is connected to the reinforced portions. A support interacts with the impact protection device and also is fastened to the holding plate. The holding plate is a large and relatively heavy component that extends over the full area of the region between the two brackets and, in the region of the remote ends of the brackets has short shoulders, in the region of which the connection to the brackets takes place.

GB 2 101 535 A1 describes a vehicle door, in which use is made of a plate-like stiffening support arranged between two supports of the vehicle door.

US 2002/0171260 A1 describes a component support as a damping element for a vehicle door.

It is the object of the invention to provide an add-on part that has a structurally simple design and relatively low weight, has good reinforcing or stiffening properties. A development of the invention refers in particular to the fact that said particularly advantageous properties can be combined with particularly good damping properties.

SUMMARY

An add-on part according to the invention has a reinforcing device with a plurality of arms, and an end region of each of the arms of the reinforcing device is connected in a force-fitting and/or form-fitting manner to the reinforced portions.

The reinforcing device with the plurality of arms has the advantage that a reduced amount of material is required for forming the reinforcing device. Furthermore, the configuration of the reinforcing device with the arms makes it possible to position the reinforcing device optimally in the region of the reinforced portions with only a small amount of space required in the region of the respective arm.

The arms may be stiffened with one another to provide a reinforcing device having very high rigidity.

The mounting or fastening of the reinforcing device is possible in a particularly simple manner because of the force-fitting and/or form-fitting connection to the reinforced portions.

The reinforcing device may be composed of metal or plastic. This material is intended to have a low specific weight to optimize the weight of the add-on part.

A material having a damping effect or a permanently elastic material may be applied to the reinforcing device. The application of this material to the reinforcing device provides durable prevention of vibration related noise. The applied material may be a plastics material, such as a plastics layer. A butyl material, such as a butyl layer, is regarded as advantageous for the long term prevention of vibration related noise.

The material or the layer may be applied in the region of the mounting of the reinforcing device in the reinforced portions and/or contact regions with the inner part and/or the outer part. Thus, noise production can be avoided or minimized as a result of damping between the reinforcing device and the reinforced portions or the reinforcing device and the inner part or outer part if the reinforcing device lies against the inner part or outer part. The reinforcing device therefore not only obtains the function of reinforcing or stiffening the add-on part, but also suppresses the generation of vibrations in the add-on part, and therefore generation of noise, because of the material that is used and applied to the reinforcing device.

The reinforced portions may be portions of the inner part and/or outer part. In one embodiment, the add-on part has two supports that have the reinforced portions. Two additional components, namely the two supports, therefore are provided in the add-on part and obtain the particular task of reinforcing or stiffening the add-on part. In principle, this can also take place, according to the first alternative, by the special design of the inner part and/or outer part.

The two supports may be connected to the inner part and/or outer part. This results in a particularly high degree of rigidity of the add-on part and therefore particularly good occupant protection in the event of an impact.

The arms of the reinforcing device may connected in the region of free ends to the reinforced portions. In particular, the reinforcing device may be a reinforcing support with four arms. In this connection, two arms may be connected to the one reinforced portion or to the one support and the other two arms may be connected to the other reinforced portion or to the other support. The reinforcing device therefore can be supported in accordance with the distance between the arms that are assigned to the respective reinforced portion or support, and can therefore durably contribute to optimizing the rigidity of the add-on part.

Free ends of the arms may have fork-shaped fastening elements for fastening to a reinforced portion assigned to the respective arm. The fork-shaped fastening elements permit optimum positioning and mounting of the arms in the reinforced portions. In addition, the arms can permit simpler positioning or insertion of the arms in the region of the reinforced portions.

One or more support elements can be arranged on the reinforcing device and can define a respective contact point with one of the reinforced portions or with the inner part or the outer part. The respective support element may be designed in the shape of a fin. The fin-shaped support element is highly functional while being simply designed and requiring little construction space.

The stiffening of the arms of the reinforcing device with one another may take place by the fact that the reinforcing device has two further intersecting arms. The arms may be connected on the ends to those arms of the reinforcing device that are connected to the reinforced portions.

In one embodiment, the reinforcing device has two substantially parallel bars that are connected by two intersecting bars. The bars may be connected to one another. This structure circumscribes a substantially clear construction space, and therefore sufficient construction space for other components of the door or other add-on part remains between the parallel bars and the intersecting bars.

The two supports may be arranged in a non-curved plane. This plane is arranged substantially vertically in the case of a door. Furthermore, the two supports may be substantially parallel to each other. Substantially means that a parallel arrangement is not advantageous but a slightly converging arrangement of the two supports is. This previously described arrangement of the supports permits particularly favorable stiffening of the vehicle door or other add-on part upon the action of impact forces in the event of a crash.

Further features of the invention emerge from the attached drawing and the description of the preferred exemplary embodiment reproduced in the drawing without being restricted thereto.

BRIEF DESCRIPTION OF THE DRAWINGS

FIG. 5 shows a first view of the reinforcing device for an upper end of an arm of the reinforcing device.

FIG. 6 shows a different view of the arm end shown in FIG. 5.

FIG. 7 shows a first view of a connecting region of lower arm end to a support.

FIG. 8 shows a different view of the connecting region shown in FIG. 7.

DETAILED DESCRIPTION

Figure 1:
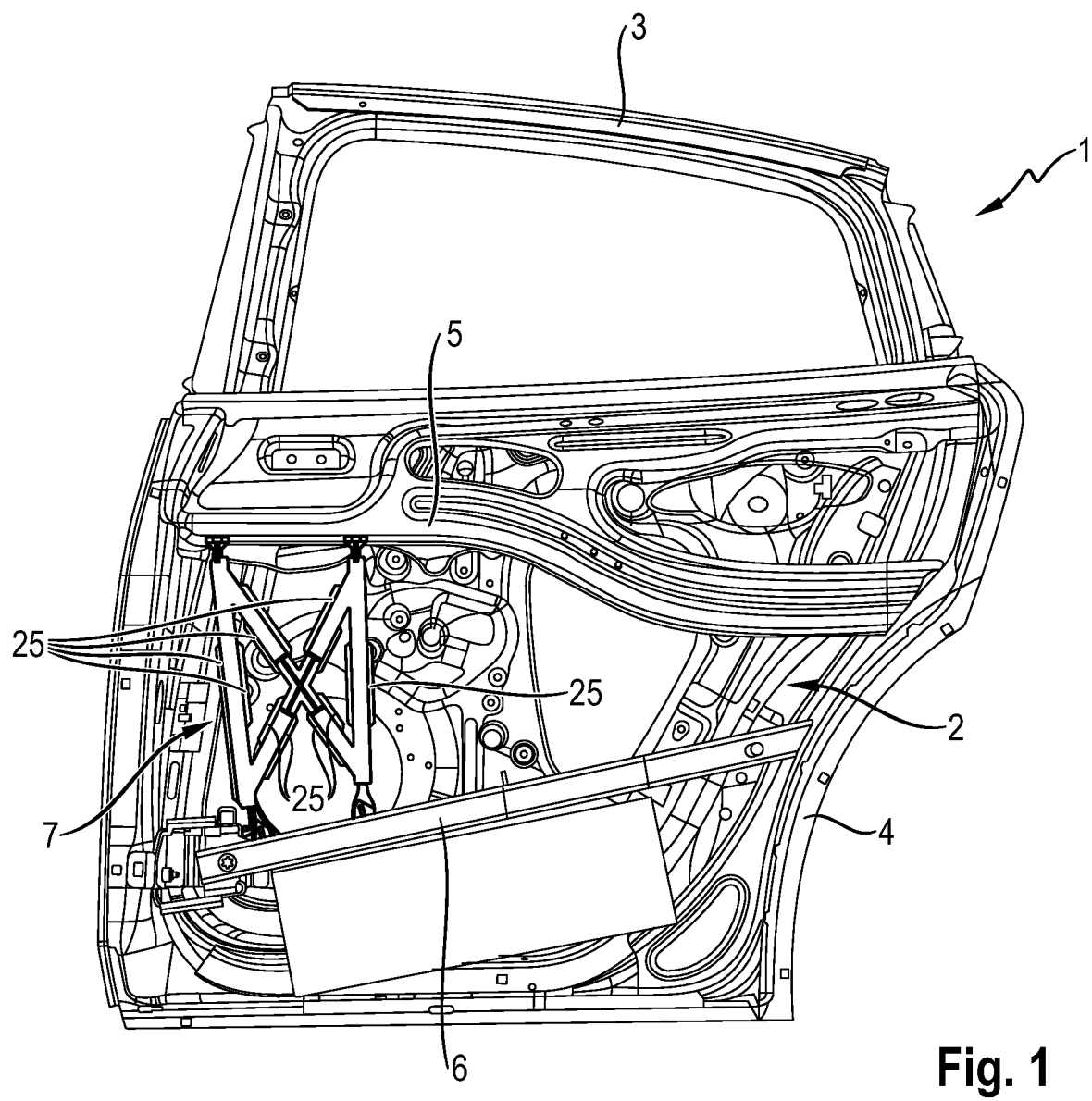
FIG. 1 shows an outer view of a body of a door of a passenger vehicle, wherein the door is provided with a reinforcing device.
Figure 2:
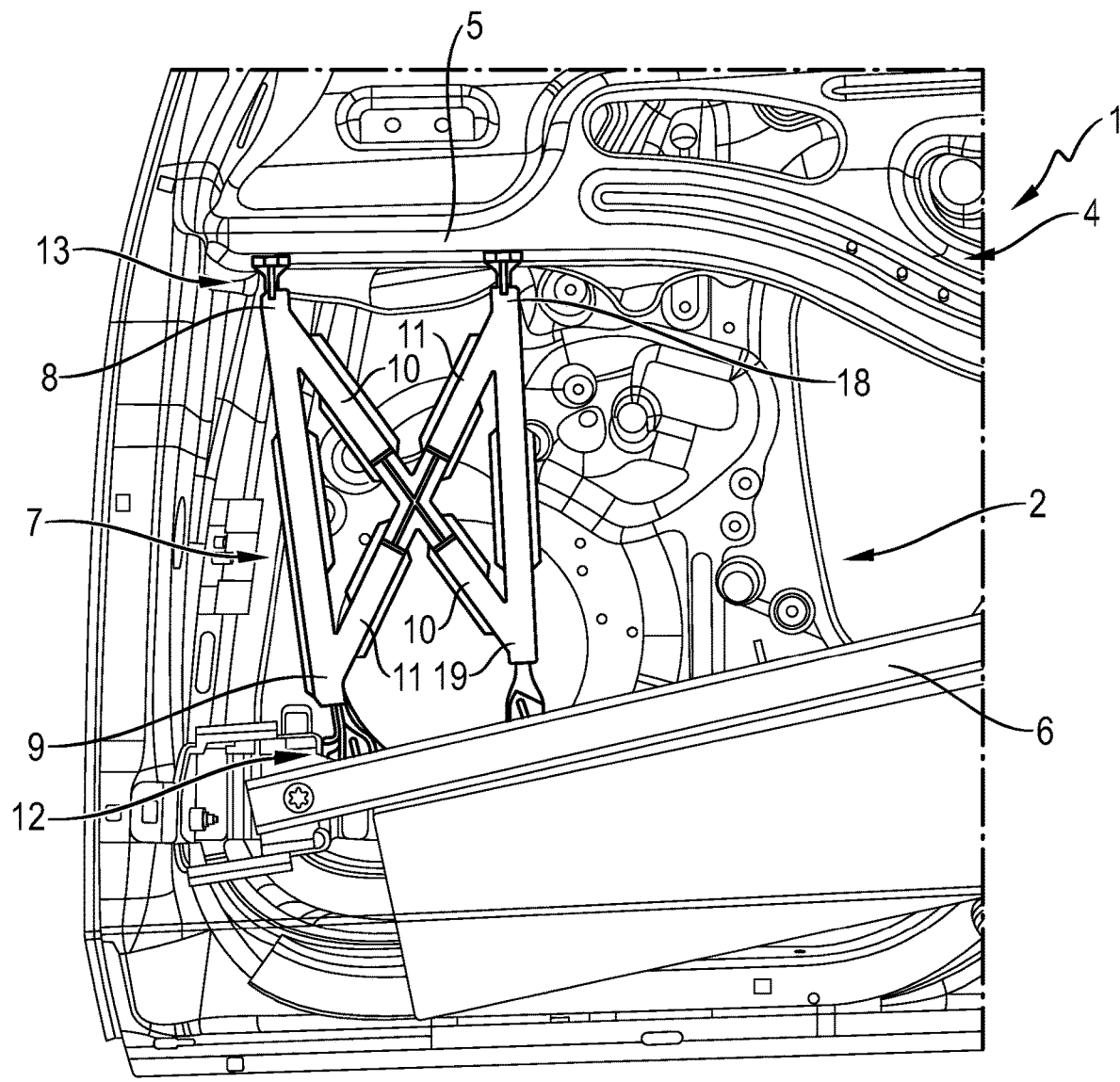
FIG. 2 shows a partial region of the door shown in FIG. 1, for the region of the reinforcing device.

FIG. 1 shows an add-on part 1 of a vehicle body, wherein said add-on part is a rear door 1 of a passenger vehicle. The add-on part or the door 1 has an inner part 2 with an integrated window frame 3 and an outer part 4. Outside the region of the window frame 3, the inner part 2 and the outer part 4 are connected to each other. The inner part 2 and the outer part 3 are pressed parts composed of sheet metal. Two supports 5 and 6 are connected to the inner part 2, on the side thereof facing the outer part 4. The supports 5, 6 are composed of metal and are screwed or welded to the inner part 2. The upper support 5 is curved and the lower support 6 is configured rectilinearly. The supports 5 and 6 are arranged in a diverging manner, as seen from the front to the rear. Therefore, because of the design with the two supports 5, 6, the door 1 has reinforced portions formed by the two supports 5, 6. The reinforced portions could also be formed by the inner part 2 and/or the outer part 4, optionally in a connecting region of said parts.

The door 1 also has a reinforcing device 7 connecting the two reinforced portions or the two supports 5, 6.

The reinforcing device 7 has four arms 8, 9, 18, 19. The respective two arms 8 and 9 or 18 and 19 in each case form a bar. The two bars are arranged substantially parallel to each other and are stiffened by an X-shaped device in the manner of two interesting arms 10, 11. The ends of the two arms 10, 11 are connected to end regions ends of the arms 8, 9, 18 and 19. The reinforcing device 7 formed in this manner is an integral or single-part component made of metal or a plastic suitable for absorbing high forces.

Figures 3, 4:
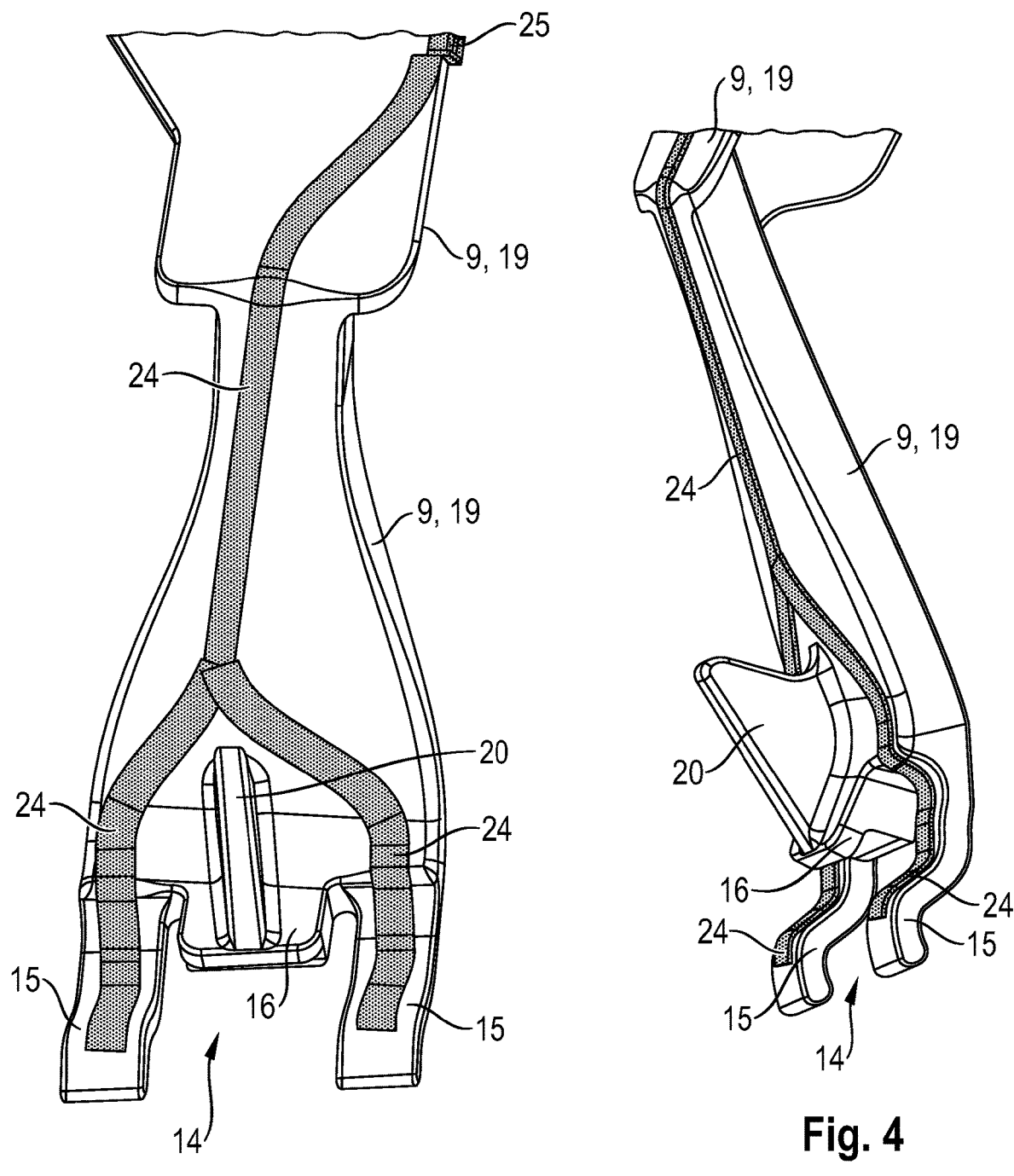
FIG. 3 shows a first view of the reinforcing device for a lower end of an arm of the reinforcing device.
FIG. 4 shows a different view of the arm end shown in FIG. 3.

The reinforcing device 7 is connected in a form-fitting manner to the supports 5, 6 in the region of the upper ends 13 of the arms 8, 18 and the lower ends 12 of the arms 9, 19. More particularly, identically configured fork-shaped fastening elements 14 are provided in the region of the lower ends 12 of the arms 9 and 19 for fastening to the lower support 6. The detailed configuration of the fork-shaped fastening elements 14 is illustrated FIGS. 3 and 4 and the interaction of the fork-shaped fastening elements 14 with the lower support 6 is illustrated in FIGS. 7 and 8. It is shown that the lower end of the respective arm 9 and 19 has two shoulders 15 arranged parallel to each other and are curved in an S-shaped manner. A mating shoulder 13 is arranged between the two shoulders 15, at a distance from the shoulders 15. The lower end 13 of the respective arm 9 and 19 is fit by plugging the fork-shaped fastening elements 14 onto an upwardly projecting web 17 of the lower support 6 so that the two resiliently flexible shoulders 15 and the mating shoulder 16 clamp the web 17 between the shoulders 15 and the mating shoulder 16. In addition, the reinforcing device 7 is provided, in the region of the respective fork-shaped fastening element 14, with a support element 18 that additionally serves as a contact point with a door part, for example with the outer part 4.

FIGS. 5 and 6 show the reinforcing device 7 in the upper region thereof, and therefore in the region of the arms 8 and 18. In the same manner as the arms 9, 19, these arms also have fork-shaped fastening elements 14 with shoulders 15 and a mating shoulder 16 and a support element 20. However, these arms are designed in a modified manner corresponding to the modified geometrical proportions of the inner part 2 in the region of the reinforcing device 7. Thus, in comparison to the design of the arms 9 and 19, the mating shoulder 16 in the case of the arms 8 and 18 is longer and the support element 20 has a flatter profile, with a greater length. The shoulder 15 of the arm 8 or 18 also extends over a greater length, and therefore an insertion portion 21 running ahead in the mounting direction is formed on the respective shoulder 15.

Figure 10:
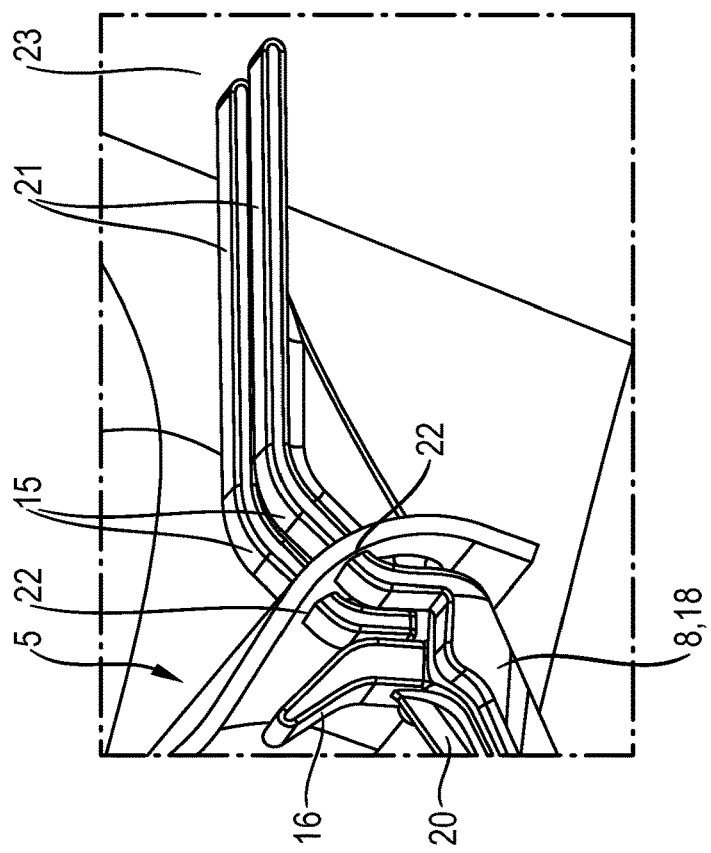
FIG. 10 shows a different view of the connecting region shown in FIG. 9.
Figure 9:
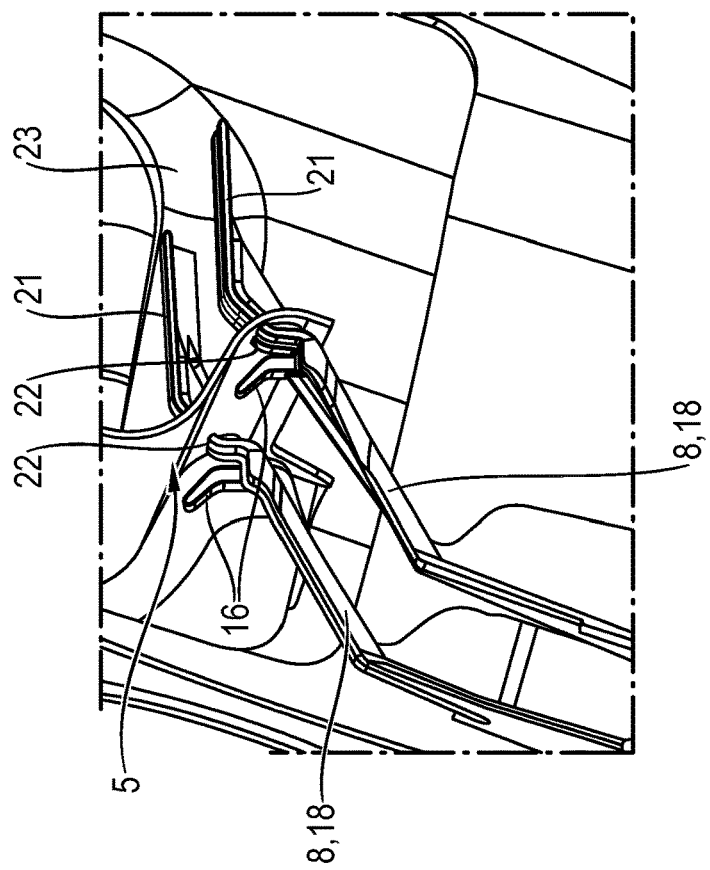
FIG. 9 shows a first view of a connecting region of upper arm end to a support.

As shown in FIGS. 9 and 10 that the upper support 5 has, in the region of sheet-metal portions, two openings 22 for the passage of the insertion portions 21, and therefore the arms 8 and 18 in the inserted end position are supported in the region of the free ends of the insertion portions 21 on a sheet-metal portion 23 of the door. In this position, the arms 8 and 18 lie with their mating shoulders 16 against the upper support 5 and are supported there. FIGS. 9 and 10 show the arms 8 and 18 before this supporting end position is reached.

The reinforcing device 7 initially is mounted by the upper arms 8 and 18 being inserted into the holes 22 until the mating shoulders 16 thereof lie against the upper support 5. The lower end of the reinforcing device 7 then is pivoted in toward the lower support 6, and the lower support 6 makes contact with the support element 20 in the region of the slope facing the support element 20. Thus, the support element 20 slides along the lower support 6 during further pivoting of the reinforcing device 7 inward, and therefore the lower support 6 slides over the mating shoulder 16 and is transferred into its latching position between the mating shoulder 16 and the two shoulders 15 of the respective arm 9 and 19.

In the case of the add-on part that is described to this extent and in the present case is a door 1 of a passenger vehicle, the supports 5 and 6 serve for stiffening the door and the reinforcing device 7 serves for additional reinforcement of the door 1. To minimize or eliminate vibrations of the door 1 or of components of the door 1, additional measures are taken in the case of the door 1 to achieve this advantage. A material having a damping effect or a permanently elastic material thus is applied to the reinforcing device 7. In particular, this material is applied in the region of the mounting of the reinforcing device 7 in the two supports 5 and 6 and on contact regions of the reinforcing device 7 with other parts of the door, for example with the inner part 2. This material is in particular a plastics material applied as a plastics layer. A butyl material is also conceivable as the material and is applied as a butyl layer. FIGS. 3 to 6 illustrate strips 24 of a butyl layer applied to the arms 8 and 18, with the strips extending in a manner branched from the shoulders 15, and accommodating the mating shoulder 16 in between and further accommodating the support element in between, into the region of the arm 8 or 18 that faces away from said mating shoulder 16. The same applies to the arrangement of the butyl layer in the region of the other arms 9 and 19. After the fork-shaped strips 24 are brought together and then continue, as shown in FIG. 1, into partial regions of the reinforcing device 7 between the arms 8 and 9 or 18 and 19, with the partial regions identified by the reference sign 25. The butyl layer in the partial regions 25 extends in an entirely flat manner, and therefore a damped contact of the reinforcing device 7 with one or more parts of the door interacting therewith, in particular with the inner part 2 of the door 1, is ensured in said regions.

The two supports 5 and 6 preferably are arranged in such a manner that they are positioned in a non-curved plane and are arranged substantially parallel to each other.

LIST OF REFERENCE SIGNS

1 Add-on part/door
2 Inner part
3 Window frame
4 Outer part
5 Support, top
6 Support, bottom
7 Reinforcing device
8 Arm
9 Arm
10 Arm
11 Arm
12 Lower end
13 Upper end
14 Fastening element
15 Shoulder
16 Mating shoulder
17 Web
18 Arm
19 Arm
20 Support element
21 Insertion portion
22 Hole
23 Sheet-metal portion
24 Strip
25 Partial region

What is claimed is:

1. An add-on part of a vehicle body, wherein the add-on part has interconnected inner and outer parts and reinforced portions and a reinforcing device connecting said reinforced portions, the reinforcing device has a plurality of arms, each of the arms of the reinforcing device having a free end region, the free end region of each of the arms having a fork-shaped fastening element fastened in a force-fitting and/or form-fitting manner to one of the reinforced portions facing the respective arm.

2. The add-on part of claim 1, wherein the reinforcing device is composed of metal or plastic.

3. The add-on part of claim 1, further comprising a material having a damping effect or a permanently elastic material applied in a region of mounting the reinforcing device in the reinforced portions and/or in contact regions with the inner part and/or the outer part.

4. The add-on part of claim 3, wherein the material is a plastics layer, or a butyl material.

5. The add-on part of claim 1, wherein the reinforced portions are portions of the inner part and/or outer part.

6. The add-on part of claim 1, wherein the add-on part has two supports that form the reinforced portions.

7. The add-on part of claim 6, wherein the two supports are connected to the inner part and/or to the outer part.

8. The add-on part of claim 6, wherein the two supports are arranged in a non-curved plane.

9. The add-on part of claim 6, wherein the two supports are arranged substantially parallel to each other.

10. The add-on part of claim 1, wherein the reinforcing device has a plurality of arms that are stiffened with one another.

11. The add-on part of claim 1, wherein the reinforcing device is a reinforcing support with four arms.

12. The add-on part of claim 1, further comprising at least one support element arranged on the reinforcing device and defining a contact point with one of the reinforced portions or with the inner part or the outer part.

13. The add-on part of claim 12, wherein the support element is a fin.

14. The add-on part of claim 1, wherein, for stiffening of the arms with one another, the reinforcing device has two further intersecting arms that are connected on the end sides to the arms of the reinforcing device that are connected to the reinforced portions.

15. The add-on part of claim 1, wherein the add-on part is a door or tailgate.

* * * * *